M. A. JONES.
COTTON CHOPPER.
APPLICATION FILED NOV. 13, 1917.
1,274,718.
Patented Aug. 6, 1918.
4 SHEETS—SHEET 1.
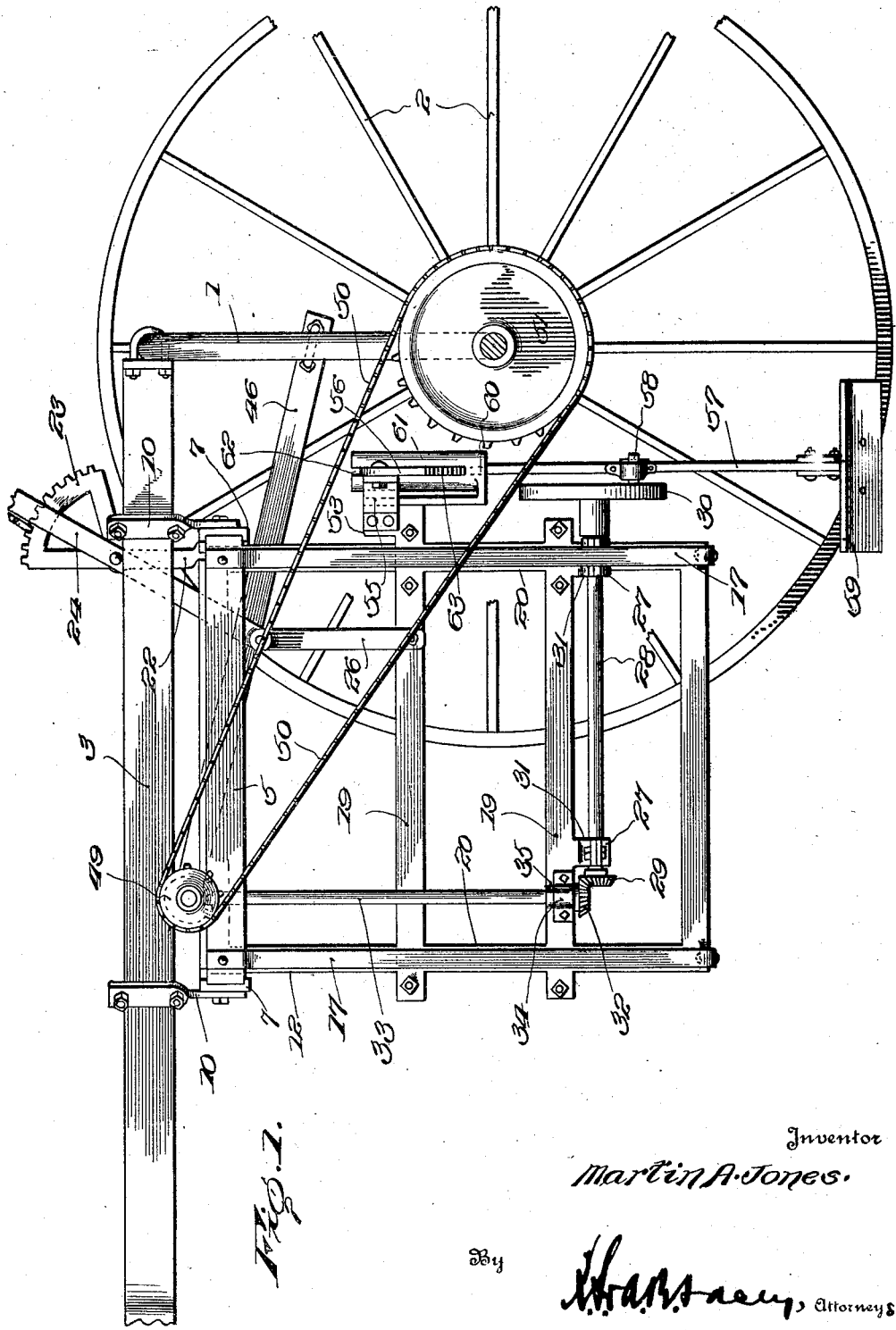

M. A. JONES.
COTTON CHOPPER.
APPLICATION FILED NOV. 13, 1917.
1,274,718.
Patented Aug. 6, 1918.
4 SHEETS—SHEET 2.
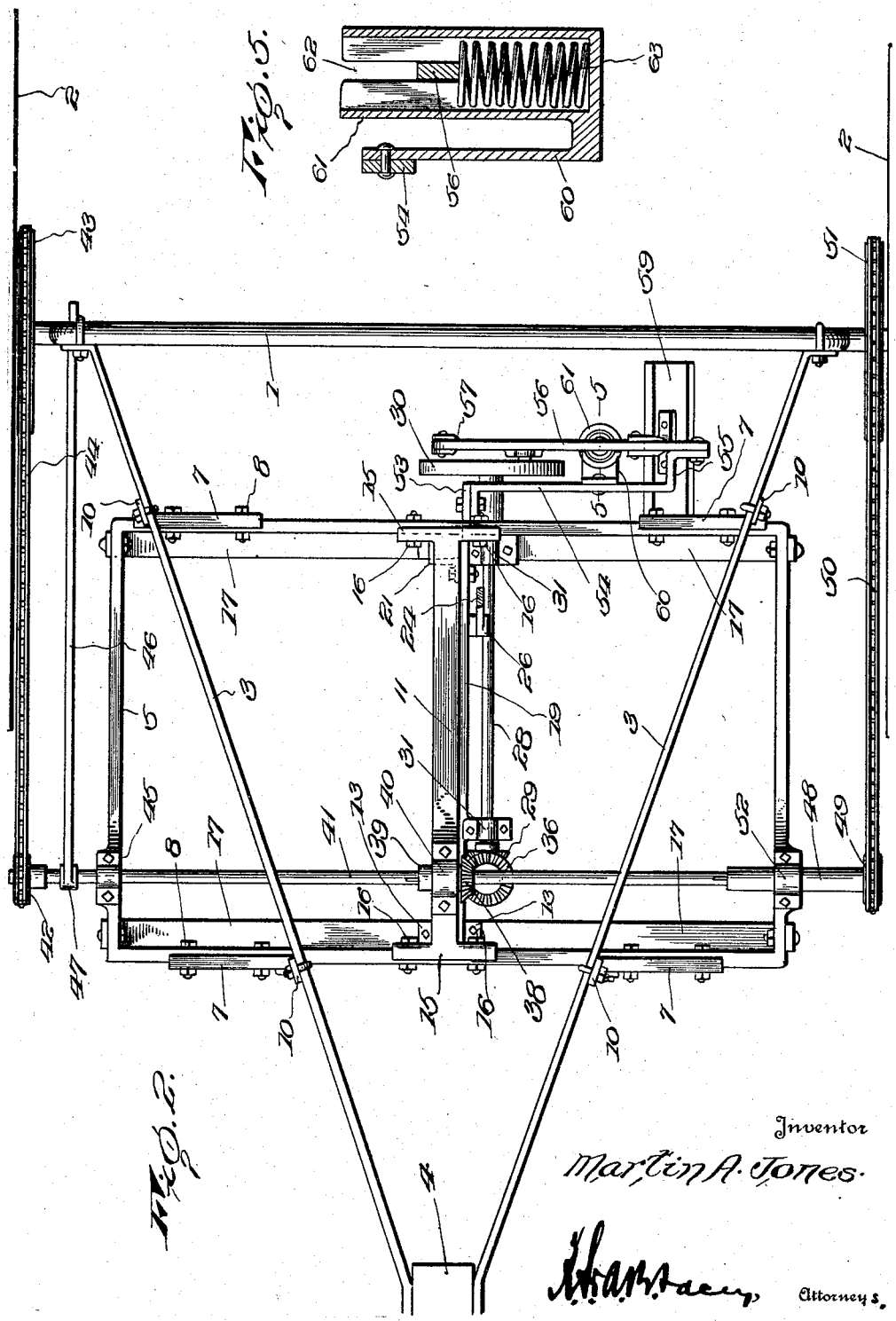

M. A. JONES.
COTTON CHOPPER.
APPLICATION FILED NOV. 13, 1917.
1,274,718.
Patented Aug. 6, 1918.
4 SHEETS—SHEET 3.
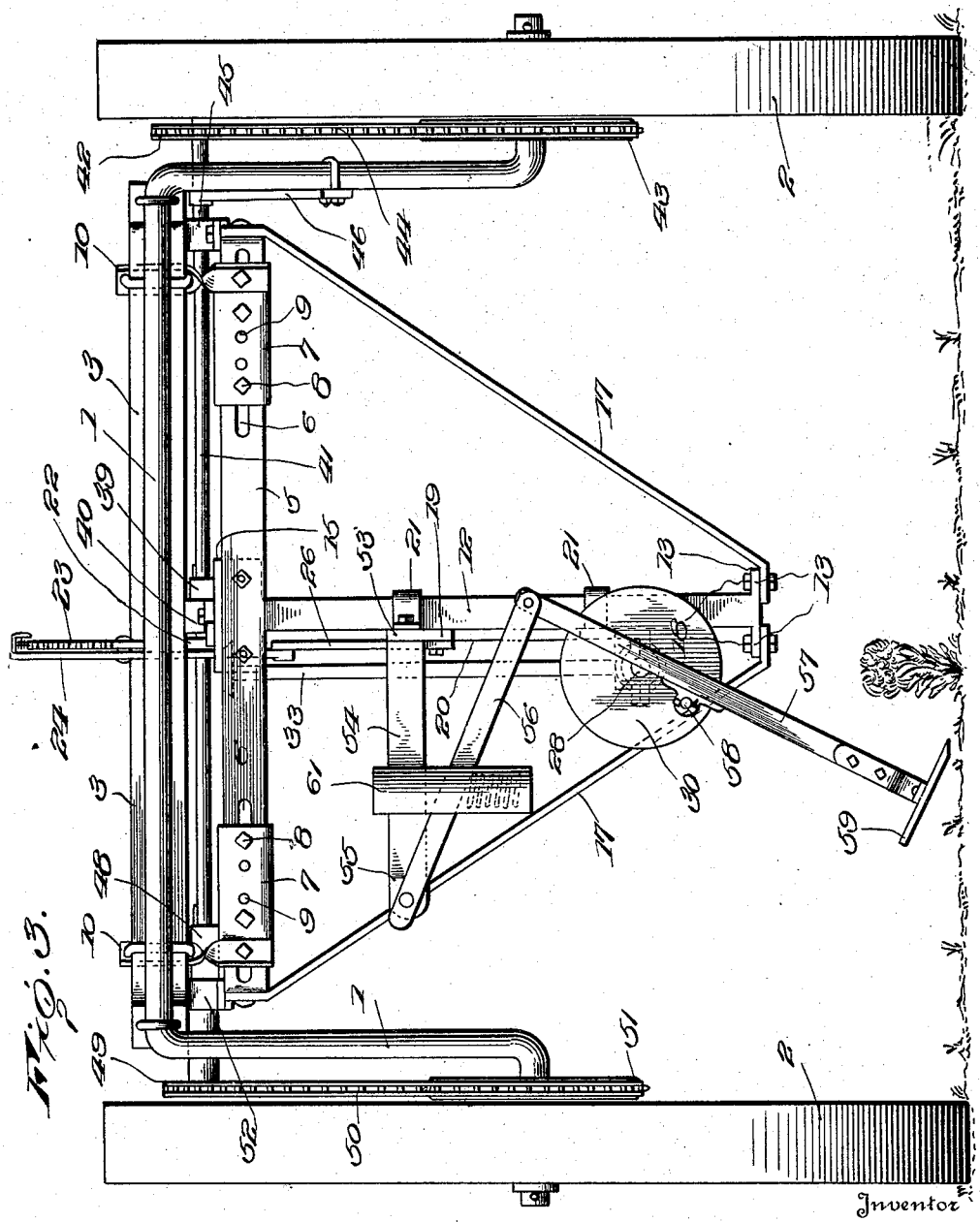
Inventor
Martin A. Jones.
By
[signature], Attorneys.

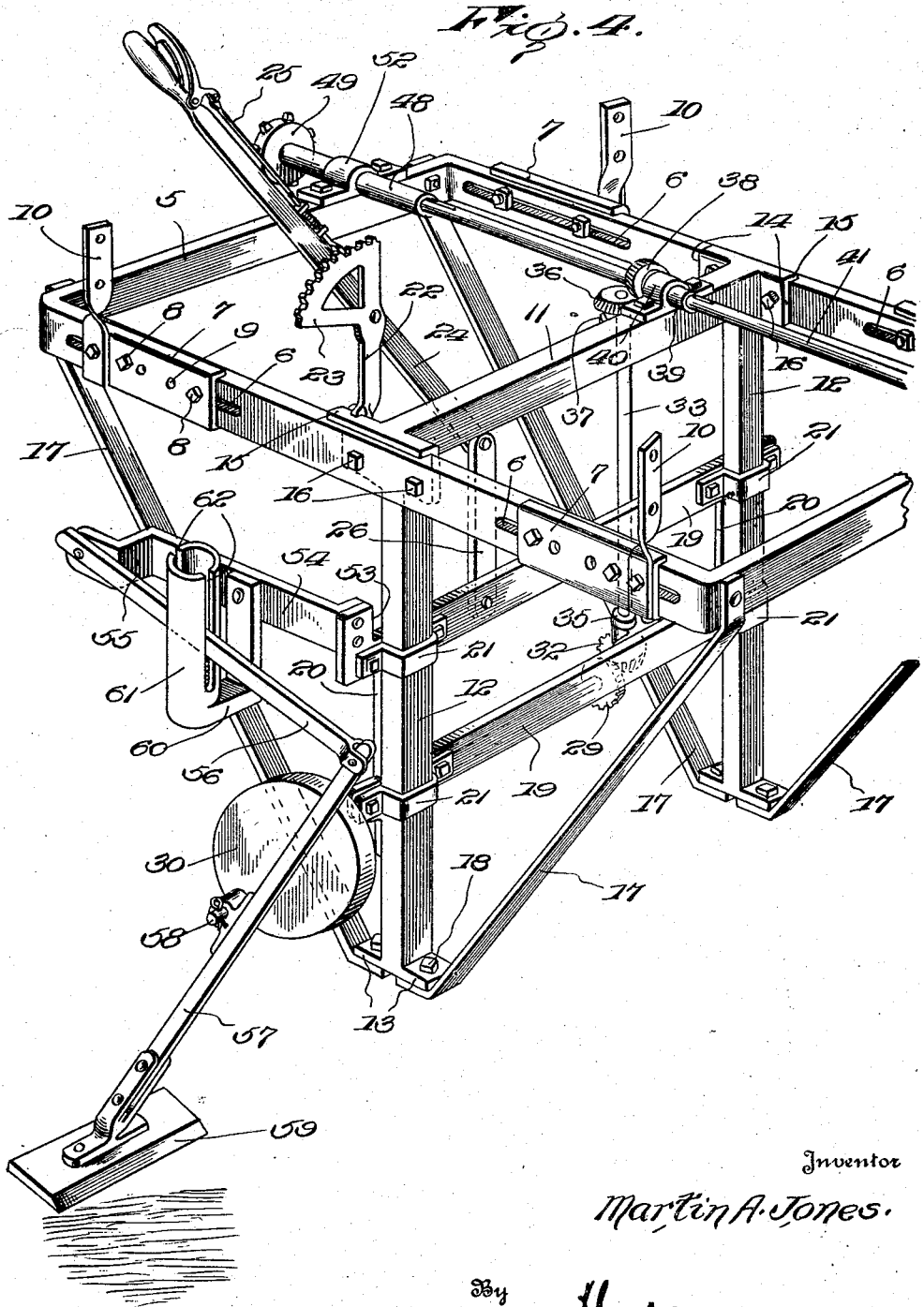

UNITED STATES PATENT OFFICE.

MARTIN A. JONES, OF McGREGOR, TEXAS.

COTTON-CHOPPER.

1,274,718.

Specification of Letters Patent.  Patented Aug. 6, 1918.

Application filed November 13, 1917. Serial No. 201,826.

*To all whom it may concern:*

Be it known that I, MARTIN A. JONES, a citizen of the United States, residing at McGregor, in the county of McLennan and State of Texas, have invented certain new and useful Improvements in Cotton-Choppers, of which the following is a specification.

My invention relates to cotton chopper attachments for cultivators and seeks to simplify the construction, reduce the cost of manufacture, and increase the efficiency of such attachments.

My invention is illustrated in the accompanying drawings, in which—

Figure 1 is a side elevation of my improved cotton chopper in position upon a cultivator frame;

Fig. 2 is a plan view of the same;

Fig. 3 is a rear elevation;

Fig. 4 is a perspective view of the chopper attachment removed from the cultivator frame;

Fig. 5 is a detail vertical section on the line 5—5 of Fig. 2.

The cultivator may be of any well-known or preferred type and in the accompanying drawings I have shown only so much thereof as is deemed necessary for an understanding of my invention, this showing including an arched axle 1 upon the ends of which are mounted the ground wheels 2 and to which are secured the rear ends of hounds 3 which converge forwardly and have their front ends secured to a draft pole or tongue 4, as will be readily understood. In applying my attachment to the cultivator frame, I employ a main frame 5 which is preferably rectangular and may be a single integral structure. The front and rear bars of this main frame are provided with longitudinal slots 6 near their ends and upon the outer sides of the said bars are fitted extension plates or bars 7 which carry bolts 8 adapted to extend through the said slots. The bolts are fitted in openings 9 formed through the bars 7 and the said bars are thus adjustably secured upon the front and rear bars of the main frame so that the hangers 10, which are secured to the said extension plates, may be secured to the hounds 3 and adjusted to the same so that whatever the width of the cultivator frame may be my improved cotton chopper may be easily secured to the same. It is, of course, obvious that if the cultivator frame is of abnormal width the extension plates may be so adjusted as to project beyond the ends of the main frame 5 and if the hounds of the cultivator frame are so close together that they pass over the main frame 5, as shown in Fig. 2, the extension plates may, if preferred, be omitted and the hangers secured directly to the main frame of the chopper attachment.

Extending between the front and rear bars of the main frame 5, at the center thereof, is a vertical frame comprising a longitudinal bar 11 and standards 12 depending from the ends of said longitudinal bar and preferably formed integral therewith. At the lower ends of the standards 12 are lateral feet or lugs 13 and at the ends of the longitudinal top bar 11 are lateral lugs 14 and transverse flanges 15 extending the full width of the said lugs and the bar 11, the said lugs 14 and flanges 15 forming an overhanging cap which will fit against the inner face of the front or rear bar of the main frame 5 and rest upon the upper edge of said bar. Bolts 16 inserted through the lugs 14 and the adjacent bar of the main frame secure the vertical frame rigidly to the main frame with the standards 12 depending therefrom. Braces 17 extend from the corners of the main frame 5 downwardly to the lugs or feet 13 and have their lower ends bent to extend under the said lugs and are secured rigidly thereto by bolts 18 inserted through the lugs and the extremities of the brace, as shown in Fig. 4 and as will be readily understood, the upper ends of the braces being secured to the end bars of the main frame 5 as illustrated. A strong, simple and durable supporting frame is thus provided which may be readily attached to the cultivator frame by an unskilled person.

Against one side of the standards 12, I place a vertically movable frame consisting of the longitudinal bars 19 and the vertical bars 20 connecting the said longitudinal horizontal bars 19 near the ends thereof, the vertical bars 20 being so disposed that they will bear against the standards 12 and thereby leave the center of the frame as unobstructed as possible and also furnish bearings for the vertically movable frame so that it will move steadily and easily when being raised or lowered. To the ends of the upper and lower bars 19, I secure straps or clips 21 which pass around the standards 12 so as to hold the vertically movable frame thereto and constitute guides to prevent rocking movement of the vertically movable frame and also as retainers to hold the said frame against the standards. Upon the main frame or the cap plate at the rear end of the bar 11, I secure a post 22 having a segmental rack 23 at this upper end, and upon the said post is fulcrumed a hand-lever 24 equipped with a latch 25 adapted to engage the rack and thereby hold the lever in a set position. The lower or front end of said lever is connected with the top bar 19 of the vertically movable frame by a link 26 so that manipulation of the lever will readily set the vertically movable frame in a desired position and thereby regulate the depth of the cut of the chopper blade or lift the said blade to such a position that it will clear the plants and not cut through the same.

Depending from the lower edge of the lower bar or beam 19 are bearing members 27 in which the chopper shaft 28 rests, said shaft being equipped with a beveled pinion 29 at its front end and with a crank disk 30 at its rear end. The shaft is held within the bearing members 27 by caps 31 fitted over the shaft and upon the said bearing members and bolted thereto in a well-known manner. The pinion 29 meshes with a similar pinion 32 on the lower end of a vertically disposed shaft 33, and said shaft is supported at its lower end in a bearing 34 provided on the lower bar 19. The hub of the pinion 32 extends through the bearing 34 and a stop collar 35 is secured on the upper end of said hub to hold the same against dropping through the bearing and to prevent lateral oscillation thereof in the bearing. The shaft 33 is splined within the hub of the pinion 32 so that the vertical movement of the pinion and its hub with the vertically movable frame will be accommodated without necessitating a disassembling of the shaft and the pinion. The upper end of the shaft 33 is equipped with a pinion 36 and is journaled in a bearing 37 provided on the side of the top bar or beam 11. The said pinion 36 meshes with a beveled pinion 38 which has an elongated hub 39 journaled in a bearing 40 secured upon the beam or bar 11, and a driving shaft 41 passes through the said hub and is splined thereto so that relative axial movement between the hub and the shaft may be effected. This driving shaft 41 extends transversely over the main frame 5 and at one end carries a sprocket pinion 42 around which and a sprocket wheel 43, fast to the adjacent ground wheel 32, is trained a sprocket chain 44. The pinion 42 is, of course, disposed laterally beyond the end of the main frame 5 and the shaft 41 is journaled in a bearing 45 provided upon the adjacent end member of the said main frame. A brace 46 may also be provided having its rear end secured to the axle 1 and its front end provided with an eye or bearing 47 through which the shaft may pass. The opposite end of the driving shaft is splined within a sleeve 48 which constitutes the hub of a sprocket pinion 49 having a chain 50 trained around the same, the said chain also passing around a sprocket wheel 51 fast with the adjacent ground wheel 2. The sleeve 48 is journaled in a bearing 52 upon the adjacent end bar of the main frame 5, and a brace similar to the brace 46 may be provided at this side of the device as will be readily understood. The braces 46 will support the extended ends of the driving shaft and it will be readily understood that by having the driving shaft splined within the hub 37 and the sleeve 48 the working length of the shaft may be increased or diminished, so that the attachment may be readily adjusted to cultivator frames of any width.

The rear end of the upper longitudinal bar 19 is constructed with an up-turned extremity 53 constituting a bracket to which is secured the inner end of a laterally extending supporting arm 54. The outer extremity of the said arm 54 is turned rearwardly as shown at 55, and an oscillatory bar 56 has its outer end pivotally attached to the extremity of the supporting arm. The inner end of this bar 56 is pivoted to the upper end of the shank 57 which is pivotally mounted between its ends upon the wrist pin 58 carried by the crank disk 30. The chopper shank 57 is, of course, equipped with a blade 59 at its lower end. Intermediate its ends, the supporting arm 54 carries a depending bracket 60 which projects rearwardly at its lower end and upon the said lower end is a guide 61 for the vibratory arm 56, the said guide being illustrated as a cylindrical post having slots 62 at diametrically opposite points through which the bar passes, and a spring 63 is disposed within the said guide below the bar so as to bear against the under side of the bar as clearly shown in Fig. 5. This spring, by its expansion, will aid in raising the bar 56 and will also act as a cushion to overcome possible shock at the lower end of the downward movement of the said bar so that the work imposed upon the chopper shaft will be lightened and the chopper blade driven with less power than would otherwise be required.

It is thought the operation and advantages of my improved attachment will be readily understood from the foregoing description taken into connection with the accompanying drawings. The construction of the frame is such that all unnecessary parts are eliminated and the chopper shaft will be supported so that it may rotate easily and will be disposed in the central line of the cultivator so as to be directly over the row of plants to be thinned. The vertically movable frame is held to the supporting frame so that it may move readily when necessary, and yet will be held against vibration after it has been set in any desired position. Power is applied to the main driving shaft from both ground wheels of the cultivator frame and said shaft, therefore, rotated more readily than would otherwise be the case, torsional strain upon the shaft being overcome and side draft eliminated. The apparatus may be readily applied to or removed from a cultivator frame by an unskilled person and may be very easily adjusted to cultivators of any width. The splined connection between the vertical transmission shaft 32 and the pinion 33 at the lower end of the same will insure a transmission of power to the chopper shaft at whatever height it may be set and will also permit a ready vertical adjustment of the chopper-carrying frame.

Having thus described my invention, what is claimed as new is:

1. In a chopper attachment for cultivators, the combination of a main frame, a chopper-carrying frame slidably mounted on the main frame, a lateral supporting arm secured to the chopper-carrying frame, a chopper shaft mounted upon the chopper-carrying frame, means for rotating said shaft, a chopper shank driven by the said shaft, a vibratory bar pivoted at its outer end to the outer end of the lateral supporting arm and at its inner end to the upper end of said shank, and a guide for said bar on said arm.

2. In a chopper attachment for a cultivator, the combination of a supporting frame, a chopper-carrying frame mounted on the supporting frame, a chopper shaft mounted upon the chopper-carrying frame, means for rotating said shaft, a supporting arm secured to and extending laterally from the rear end of the chopper-carrying frame, a chopper shank operatively connected with the chopper shaft, a vibratory bar pivoted at its outer end to the outer end of the lateral supporting arm and at its inner end to the upper end of said shank, and a buffer for said bar disposed below the same and carried by said supporting arm.

3. In a chopper attachment for cultivators, the combination of a supporting frame, a chopper-carrying frame on the supporting frame, a chopper shaft mounted on said chopper frame, means for rotating said shaft, a chopper shank operatively connected with said shaft, a supporting arm secured to and extending laterally from the chopper-carrying frame, a vibratory bar pivoted at its outer end to the outer end of said arm and at its inner end to the upper end of the chopper shank, a bracket secured to and depending from said lateral arm, a tubular guide on said bracket provided with vertical slots to receive said vibratory bar, and a coiled spring housed by said guide and bearing against the under side of the vibratory bar.

4. A chopper attachment for cultivators comprising a supporting frame, bearings on the top of said frame and at the ends thereof, a chopper shaft supported at the center of the frame and on the lower portion thereof, a transmission shaft geared to the chopper shaft and disposed vertically upon the supporting frame, a pinion journaled upon the supporting frame at the center thereof and geared to the upper end of said transmission shaft, a sleeve journaled in the bearing at one end of the supporting frame, a sprocket on the outer end of said sleeve, a driving shaft splined in said sleeve and in the hub of the pinion at the center of the frame and journaled in the bearing on the frame at the side of the same remote from said sleeve, a sprocket pinion on the end of said driving shaft, and means for operatively connecting said pinion and the first-mentioned sprocket pinion with the ground wheels of a cultivator.

5. In a chopper attachment for cultivators the combination of a main frame, a vertically disposed frame consisting of a longitudinal bar and standards depending from the ends of said bar, cap plates at the ends of said bar fitting against and resting on the front and rear sides of the main frame, braces secured at their upper ends to the corners of said frame and at their lower ends to the lower ends of the said standards, a vertically movable frame slidably mounted on the said standards, a chopper carried by said vertically movable frame, and means for operating said chopper.

In testimony whereof I affix my signature.

MARTIN A. JONES. [L. S.]

Copies of this patent may be obtained for five cents each, by addressing the "Commissioner of Patents, Washington, D. C."